F. F. BENSON.
AUTOMOBILE FENDER.
APPLICATION FILED MAR. 16, 1918.
1,294,996.
Patented Feb. 18, 1919.
2 SHEETS—SHEET 1.
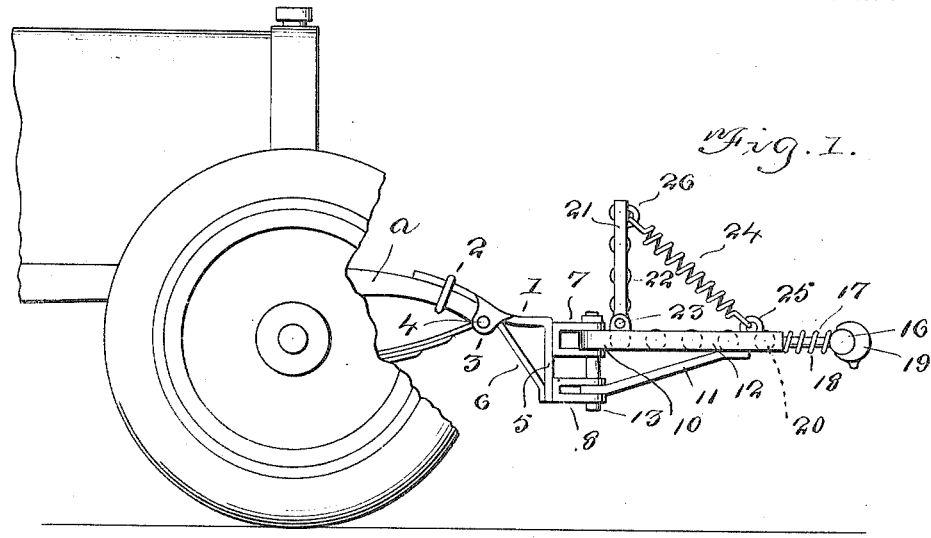
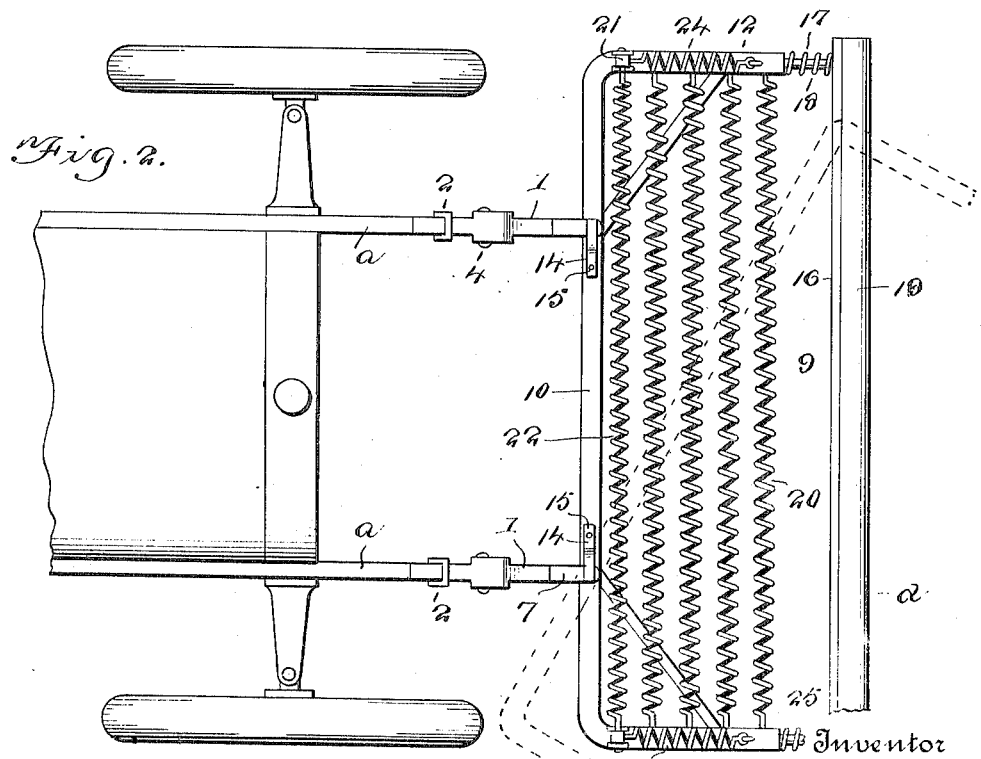

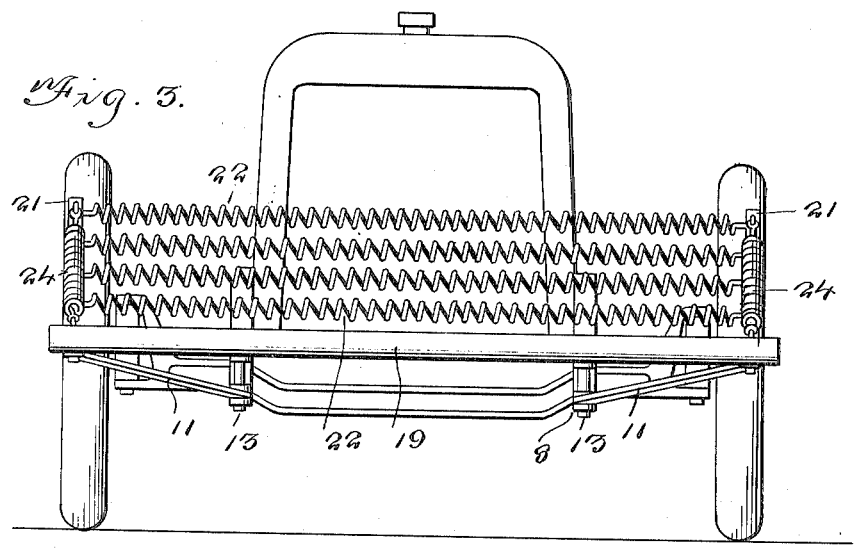
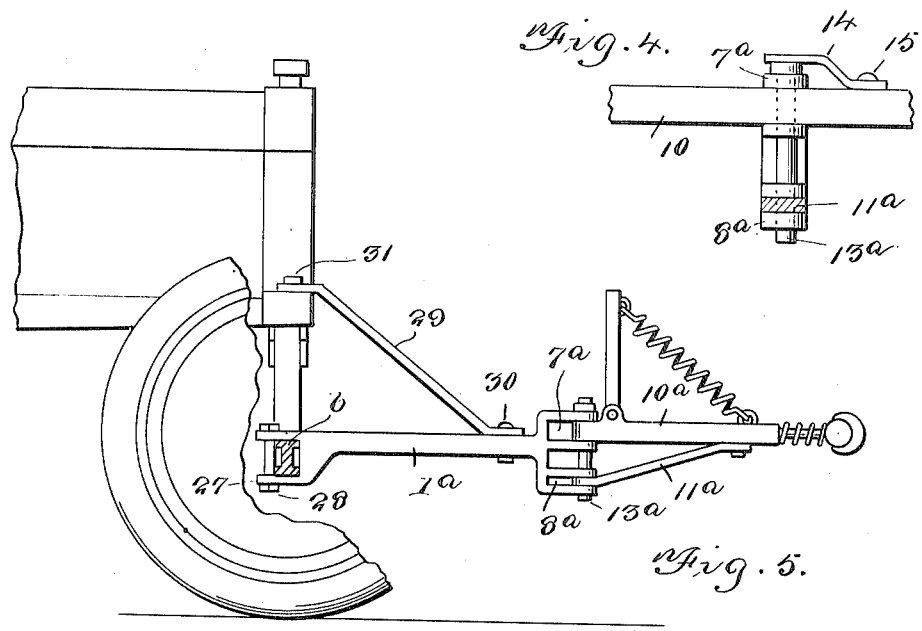

UNITED STATES PATENT OFFICE.

FRED F. BENSON, OF CHINOOK, MONTANA.

AUTOMOBILE-FENDER.

1,294,996.      Specification of Letters Patent.      Patented Feb. 18, 1919.

Application filed March 16, 1918. Serial No. 222,935.

*To all whom it may concern:*

Be it known that I, FRED F. BENSON, a citizen of the United States, residing at Chinook, in the county of Blaine and State of Montana, have invented new and useful Improvements in Automobile-Fenders, of which the following is a specification.

This invention relates to improvements in automobile fenders.

One object of the invention is to provide an improved automobile fender which embodies an air inflated cushion arranged on the fender bar and which serves to prevent injury to a person who may be struck by the fender.

Another object of the invention is to provide an improved automobile fender which embodies a frame of novel construction and which has a spring bottom and a spring back to avoid injury to a person who may be struck and caused to fall on the fender.

Another object is to provide an improved fender which is pivotally mounted so that it may be swung to one side out of the way to enable the automobile to be readily cranked.

With the above and other objects in view, the invention consists in the construction, combination and arrangement of devices hereinafter described and claimed.

In the accompanying drawings:—

Figure 1 is an elevation of an automobile fender constructed and arranged in accordance with my invention, and showing the same mounted on the front ends of the chassis side bars.

Fig. 2 is a plan of the same showing the fender in normal position in full lines and turned on its pivot and swung to one side in dotted lines.

Fig. 3 is a front elevation of the same embodying a modification in construction whereby the fender is secured on the front axle.

Fig. 4 is a detail elevation, partly in section.

Fig. 5 is a side elevation of the modified form of fender and showing the same attached to the front axle of an automobile, the front axle being shown in cross section.

In the embodiment of my invention, as shown in Figs. 1 and 2, a pair of brackets 1 are provided which are adapted to be secured on the front ends of the side bars *a* of an automobile chassis by means of clips 2 and are provided also with lugs 3 having openings through which extend the bolts 4 at the front ends of the front axle springs. Each bracket has a downwardly extending vertical arm 5 and also has a brace 6. Secured to each arm 5 near its upper end is a forwardly extending substantially U-shaped yoke 7. A similar yoke 8 is also secured to each arm 5 near its lower end.

The fender 9 embodies a substantially U-shaped frame 10 the rear side of which is arranged in the yokes 7. Braces 11 are attached at their front ends to the side arms 12 of the fender frame and have their rear ends inserted in the yokes 8. Vertical pins 13 are passed through alining openings with which the yokes 7, 8, the fender frame and the braces 11 are provided, and serve to detachably secure the frame to the brackets as will be understood. By first removing one of the pins 13, the fender frame can be turned to one side on the other pin, as a pivot, as indicated in dotted lines in Fig. 2, to enable access to be had to the crank so that the automobile can be readily cranked when required. I also provide brace straps 14 which are secured on the rear bar of the fender frame and bear on the heads of the pins 13. These brace straps serve to hold the pins in place and are pivoted as at 15 so that they can be swung out of the way to uncover the heads of the pins and permit the removal of either or both of the pins as may be required.

The side arms 12 of the fender frame are tubular and are open at their front ends. A fender bar 16 is arranged transversely across the front side of the fender frame and is provided near its ends with rearwardly extending arms 17 which are telescopically fitted and movable in the tubular arms 12 of the fender frame so that the bar is connected to the fender frame for forward and rearward movement with respect to the fender frame. Cushioning springs 18 are arranged on the arms 17, between the front ends of the arms 12 and the fender bar and serve to normally hold the fender bar in forwardly projected position and also serve to cushion the fender bar against shock. Hence, should the fender bar strike a person, the shock will be measurably absorbed by the springs 18 and injury avoided or minimized.

To provide against injury to the person, I provide an air inflated cushion 19 which is preferably constructed as here shown and is secured on and projects forwardly from the fender bar. The cushion is hollow, may be made of rubber or other suitable material and, in practice, is provided with a valved nipple to which the hose of an air pump may be connected, the air pump being used to inflate the air cushion, as will be understood.

To catch a person who may be struck by and fall over the fender bar, I provide the frame of the fender with a spring bottom which is here shown as comprising a series of longitudinally arranged coiled springs 20 the ends of which are attached to the arms 12 of the fender frame.

I also provide a spring back which comprises a pair of standards 21 and longitudinally arranged coiled springs 22 the ends of which are attached to said standards. The lower ends of the standards are pivotally connected to the arms 12 of the fender frame near the rear corners of the fender frame, as shown at 23. Hence, the spring back may be turned rearwardly. To hold the spring back in normal vertical position, as shown in Fig. 1, I also provide coiled holder and cushioning springs 24 the lower ends of which are attached, by means of hooks 25 to the arms 12 of the fender frame, the upper ends of said springs being attached, by means of hooks 26, to the upper ends of said standards. These springs 24 coact with the springs 22 and also with the bottom springs 20 to yieldingly receive a person who may be struck and caused to fall on the fender and to cushion and absorb the shock and thereby prevent injury to such person.

In the modified form of the invention, shown in Figs. 3, 4 and 5, I provide brackets 1ª which are employed instead of the brackets 1 and which have notched rear ends 27 to receive the front axle $b$ and are also provided with bolts 28 to enable said brackets to be rigidly secured to the front axle. Yokes 7ª, 8ª are provided at the front ends of the brackets to respectively receive the rear side of the fender frame 10ª and the rear ends of the braces 11ª. The detachably securing and pivoting pins are shown at 13ª. Braces 29 are also provided which have their front ends secured as at 30 and have their rear ends secured on the front end of the chassis as at 31.

While I have herein shown and described preferred embodiments of my invention, I will have it understood that changes may be made in the form, proportion, and construction of the several parts, without departing from the spirit of my invention and within the scope of my appended claims.

I claim:

1. A fender of the class described, embodying a substantially U-shaped frame having tubular side arms, open at their front ends, a fender bar in front of the frame and extending thereacross, arms attached to the fender bar, extending rearwardly therefrom and telescopically fitted in the arms of the frame, and cushioning springs serving to normally project the fender bar.

2. In combination with a fender, supporting and attaching brackets therefor, pivoting pins connecting the frame to the brackets and permitting turning movement of the frame and braces for the frame, said braces being also engaged by said pivot pins.

3. A fender of the class described embodying a frame having a yieldable cushioning bottom and also having a yieldable cushioning back, the back being pivotally attached to the frame, and cushioning means for the back normally holding the same in upright position.

In testimony whereof I affix my signature.

FRED F. BENSON.